United States Patent [19]
Thompson

[11] Patent Number: 6,132,148
[45] Date of Patent: Oct. 17, 2000

[54] MACHINING TOOL AND METHOD FOR FORMING SAME

[75] Inventor: Michael Frederick Thompson, London, United Kingdom

[73] Assignee: Habit Diamond Limited, London, United Kingdom

[21] Appl. No.: 09/125,250

[22] PCT Filed: Feb. 17, 1997

[86] PCT No.: PCT/GB97/00437

§ 371 Date: Aug. 14, 1998

§ 102(e) Date: Aug. 14, 1998

[87] PCT Pub. No.: WO97/29877

PCT Pub. Date: Aug. 21, 1997

[30] Foreign Application Priority Data

Feb. 15, 1996 [GB] United Kingdom .................. 9603158

[51] Int. Cl.[7] .................................................. B23B 51/02
[52] U.S. Cl. .......................... 408/144; 76/108.6; 419/28; 428/323; 428/698; 408/145; 408/226; 408/230
[58] Field of Search ................................ 76/101.1, 108.1, 76/108.6; 408/144, 145, 226, 227, 230; 407/118; 428/323, 698; 51/307, 309; 419/8, 28

[56] References Cited

U.S. PATENT DOCUMENTS

| | | |
|---|---|---|
| 4,160,616 | 7/1979 | Winblad .................................. 408/144 |
| 4,679,971 | 7/1987 | Maier ...................................... 408/145 |
| 4,713,286 | 12/1987 | Bunting et al. ......................... 428/323 |
| 4,762,445 | 8/1988 | Bunting et al. ......................... 408/144 |
| 4,907,377 | 3/1990 | Csillag et al. ............................. 51/309 |
| 5,226,760 | 7/1993 | Nishimura ............................... 408/144 |
| 5,273,379 | 12/1993 | Nishimura ............................... 408/145 |
| 5,580,196 | 12/1996 | Thompson ............................... 408/145 |
| 5,685,671 | 11/1997 | Packer et al. ............................ 407/118 |

FOREIGN PATENT DOCUMENTS

| | | | |
|---|---|---|---|
| 0 132 652 | 2/1985 | European Pat. Off. . | |
| 218010 | 9/1987 | Japan ...................................... | 408/145 |
| 2152703 | 6/1990 | Japan ...................................... | 408/144 |
| 1144800 | 3/1985 | U.S.S.R. ................................. | 408/145 |

*Primary Examiner*—Daniel W. Howell
*Attorney, Agent, or Firm*—Rohm & Monsanto, P.L.C.

[57] ABSTRACT

A machining tool and method of making same includes a blank that is formed to a shank and which is provided with machining faces. The machining faces are configured to expose material of a PCD or PCBN element that is formed in a recess in the blank and fused to the blank using material from the transition group of elements, such as cobalt. The recess has a configuration that is defined by side walls, a base wall, and end walls, so as to define a mold in which the PCD or PCBN material is formed into an element that becomes fused with the blank. Such fusing is achieved by leaching of the cobalt into the PCD or PCBN element during the application of heat. Thus, no additional fabrication process is required for joining the PCBN or PCD material to the blank.

20 Claims, 5 Drawing Sheets

MACHINING TOOL AND METHOD FOR FORMING SAME

The invention which is the subject of this application relates to the formation of a machining tool and the method and provision of blanks for the manufacture of same, said tools provided with a machining tip and/or machining faces formed at least partially by a suitable material containing abrasive polycrystalline diamond or cubic boron nitride referred to hereonin respectively as PCD and PCBN.

It is known that many attempts have been made to incorporate PCD or PCBN material onto the machining faces and edges of machining tools in an attempt to improve the performance and life of the machining tools. One method which is particularly well known is to attempt to fabricate the machining faces of the tools to include PCD or PCBN material by brazing multiple pieces of PCD or PCBN onto a body. Typically these pieces are brazed in positions to form machining faces and or cutting tips of machining tools and, if a sufficient depth of the material is to be obtained to render the machining tools economical, the material is required to be added to cover the tip and flutes of the tool. The common problem with known types of fabrication is that there is a risk that a gap, albeit narrow in size, exists between the body of the tool and the PCD or PCBN material. These gaps are susceptible during use of the tool as the cutting forces created during use tend to act to widen the gap and, in some instances, cause the PCD or PCBN material to be removed from the tool. Whether the gap is widened or the material wholly removed, the cutting effect of the tool is significantly reduced and the tolerances and quality of machining which are obtained are also reduced so that the tool is, in many instances, not usable and the advantages of the PCD or PCBN material in terms of hardness and long life are not realised.

A further problem is that the gap between the body and the PCD or PCBN pieces acts as a trap for foreign matter such as material from the articles which are machined, coolant and general debris. This acts to reduce the quality of machining and the life of the tool A yet further problem is caused by the constraints of fabrication in terms of the complexity of fabrication which can be performed. For example, it is extremely difficult to fit PCD or PCBN pieces into position on the spiral flutes of machining tools and, in general, the difficulties cause the machining faces to be formed wholly of the PCD or PCBN material with reduced support provided for said pieces by the body due to the gaps created between the body and the pieces as discussed above.

While some of these problems have been overcome the tools produced have had limited success due to the performance and adaptability constraint problems.

It is also known that the chemical reaction between carbide material and PCD or PCBN material causes the same to be capable of fusing together as it is known that elements which are present in carbide leech into the PCD or PCBN material to effectively fuse the same together under the required conditions.

One known type of drill which includes reference to the direct application of PCD or PCBN material to carbide is disclosed in patent U.S. Pat. No. 4,713,286 wherein a single insert is provided for inclusion in a conical tip of a blank from which a drill can be manufactured for use in Printed Circuit Board machining and therefore drills of small diameter size of up to 3.2 mm diameter can be made at the present time. The method as disclosed in this patent is not regarded as suitable for the manufacture of larger diameter drills as is discussed in the U.S. Pat. No. 4,762,445 of the same proprietor which states that, for larger diameter drills, at least two, separate, veins of PCD or PCBN material are required in order to provide resistance to cracking of the single vein insert in larger diameter drills and this is an inherent problem of adding formed inserts into blanks by fabrication.

The aim of the present invention is to provide PCD or PCBN material as an integral part of a machining tool for any of a range of machining functions such as drilling, reaming, milling and tapping in a form which allows the PCD or PCBN material to be provided, when the machining tool is formed, in the machining faces of the tool to obtain the desired machining improvements which can be provided by use of PCD or PCBN material and to allow the PCD or PCBN material to be formed into an element while in the blank with the same acting as a mould.

The present invention provides, in a first aspect, a machining tool incorporating a portion with machining faces formed therein said portion including an element of PCD or PCBN material positioned in a recess therein and characterised in that when the portion is in a blank, cylindrical form, the recess is located depending outwardly and downwardly from the centre of the top face of the blank and is defined by end walls, side walls and a base with said element fused with the material of said blank to act as part of the tool.

Typically the element is formed of PCD or PCBN material in a powder form which is placed to fill the recess in the blank and is then pressed and heated to a sufficient temperature to cause material from which the blank is made to leach into the element and effectively fuse the PCD or PCBN material to the blank. The blank is in turn affixed to a shank to form the machining tool with machining faces incorporating at least some of the material of the element.

In a further aspect of the invention there is provided a blank for the formation of machining faces therein to form an integral part of a machining tool, said blank having a cylindrical form with first and second end faces and characterised in that one of said end faces includes a recess formed therein for the reception and location of PCD or PCBN material, said recess having a longitudinal axis located substantially along a diameter of the face, end walls, base and side walls.

Typically the side walls of the recess fan outwardly from the centre point of the end face and in one embodiment pairs of side walls of the recess depend outwardly from the centre point of the face of the blank and in each pair, the walls are formed such that the angle of one wall in each pair relative to a vertical plane is greater than the angle of the other wall in said pair. In one embodiment the wall with the greater angle, when the blank has machining faces formed therein, is removed to expose the PCD or PCBN element to form a machining face and thereby negate the need for any machining of the element of harder material. In one embodiment the angle of said wall is in the region of 30 degrees from vertical. Typically the walls which lie at the greater angle in each pair are diametrically opposed on either side of the centre point of the blank face thereby allowing a machining face on each side to be formed in due course. In one embodiment two pairs of side walls are provided, one pair depending outwardly from a narrow portion of the same in a radial manner in a first direction and a second pair depending radially outwardly from the narrow portion in a second direction. In an alternative embodiment a third pair of side walls are provided to form a three portion recess, each portion spaced apart by typically 120 degrees. In yet further embodiments it is possible that four, five or more pairs of side walls are provided depending on the tool to be formed. In whichever embodiment sufficient PCD or PCBN material is provided in a powder form to pack and fill the recess formed up to the surface of the end face of the blank, or alternatively, may be filled to a level predetermined by a packing limiter.

Typically the base of the recess slopes downwardly away from the centre of the face of the blank in which the recess is formed which is the shallowest point of the recess, towards the end walls of the recess which are the deepest points of the recess.

In one form a series of recesses can be formed at designated positions on the blank relative to the machining faces to be formed, each recess having PCD or PCBN material elements formed therein.

Typically the end walls of the recess lie adjacent to, but do not breach, the side walls of the body of the blank and so in addition to forming a recess of a form in which the PCD or PCBN element is to be used, the recess also acts as a mould to allow the PCD or PCBN powder to be pressed and heated to take the form of the recess, form the element and fuse with the blank material. Thus, no fabrication of PCD or PCBN material to the blank is required.

In a further aspect of the invention and for whichever form of recess of the blank, the PCD or PCBN material is pressed into a shaped form defined by the recess and the top face of the blank with the faces of the element having a shape and angular configuration to suit the specific requirements for the tool to be subsequently manufactured from the blank. Alternatively the element, when formed in the recess of the blank need not completely fill the recess but only to a level defined by the pressing apparatus although this may not be a practical or preferred option. By providing the element with faces of form which will allow subsequent use, the need to subsequently machine the element to any extent is eliminated and this saves machining time, wastage of expensive material and also prevents the difficulties which are conventionally encountered in attempting to machine the relatively hard material of the element. Thus, to form the blank with machining faces, typically when the same is joined to the shank, only the carbide material of the blank is required to be machined as the PCD or PCBN element is already formed to the required shape and this represents a considerable advantage over conventional machining tool fabrication.

In one embodiment the recess is shaped such that the side walls of the same have a non linear configuration. Typically the recess and element are shaped such that the side walls of the same fan outwardly from a narrow section, said narrow section located substantially at the centre of the blank face when viewed in plan.

In one embodiment at least part of some of the side walls of the recess are provided with step portions formed therein. Typically the steps are formed and located in the blank such that the wider parts of the element formed by the step portions are located in the recess to form the machining faces of the tool. Typically, the parts of the side walls of the recess which, in use, will be removed to expose the element to form the machining faces of the machining tool when rotated, have step portions formed therein.

In whichever embodiment it can be provided that a substantially greater part of each of the fan shaped portions, when viewed in plan, is offset to one side of the longitudinal axis of each portion depending outwardly from the centre of the face. Typically the said substantial parts of each portion are all located on the same side of their respective longitudinal axes.

In one embodiment, and in whichever form, the depth of the recess at the centre point is substantially less than the depth of the recess at the edges of the same and typically the depth of the recess increases on a graduated basis from the centre of the blank face to the end walls of the recess. Thus, the element formed therein has a raised centre portion from which radially, and downwardly, depend a plurality of portions, the number of which depends on the number of fan shaped portions formed in the recess. As the PCD or PCBN material is pressed to lie at the angle of the bottom faces of the recess then when the same is heated a material in the transition group of elements is provided to contact with the PCD or PCBN element to fuse the same to the blank and thereby form the element as an integral part of the blank thus ensuring close contact and good quality of bond between the surfaces of the element and recess. In one embodiment the material from the transition group which is used is preferably cobalt or a cobalt alloy but can equally be nickel or any other suitable material, but from hereonin, for illustration purposes, is referred to as cobalt. Furthermore the cobalt can be provided in the carbide blank so as to leach into the PCD or PCBN element to fuse the same to the blank, or the material may be mixed in a powder form with the PCD or PCBN material or may be provided as an insert which is first placed into the recess before the PCD or PCBN material or may be used in any combination of these.

The PCD or PCBN element is typically formed from the powder placed into the recess and joined to the blank by the action of the cobalt from the carbide in the blank leaching or otherwise transferring under high temperature and pressure, into the PCD or PCBN material to, in effect, fuse the element as an integral part of the blank.

If the tool to be formed is a twist drill with a conical face then, preferable, the angle of the bottom surface of the recess and hence the bottom face of the element will match that of the conical top face and could, for example, be 118 degrees.

In a preferred form, the element of PCD or PCBN material is provided in a position such that the carbide material of the blank forms part of, or provides, a backing surface of the machining faces thereby creating machining faces which include the PCD or PCBN material and also, selectively, the carbide material, thereby providing a machining tool with improved tool life and performance.

Although reference is made to the provision of one element of PCD or PCBN material it should be appreciated that more than one element of PCD or PCBN material can be used so that in conjunction the elements are formed in a number of recesses provided in the blank.

The recess and element of the machining tool are located in the blank in relation to the machining faces to subsequently be formed in the tip of the tool such that the edges of the element form at least part of the machining faces of the tool when formed from the blank and shank.

In one embodiment of the invention the recess is shaped such that when the PCD or PCBN material placed therein is formed in to an element, the outer edges of the element are provided with a thickened downwardly depending, portion which, when subsequently machined, depend down the side wall of the machining tool. The portions are located so as to be in line with the machining faces formed in the blank of the machining tool.

In a further aspect of the invention there is provided a method for forming a machining tool blank, said method comprising the steps of forming a blank having a cylindrical shape and in at least one of said first or second end faces forming a recess defined by end walls, side walls and a base, filling the recess with PCD or PCBN material in a powder form, applying pressure to the PCBN or PCD material and heating the blank and PCD or PCBN material to form the same into an element in the blank.

Typically the method includes the step of providing a material from the transition group of elements such as cobalt or nickel in a form such that by heating the blank the material has the effect of causing the PCD or PCBN material to fuse with the blank and act as an integral part thereof. One preferred method is to provide the blank of carbide such that cobalt from the blank leaches into the PCD or PCBN material during heating, but alternatively, the appropriate material can be mixed in a powder form with the PCD or PCBN or an insert of the material is provided in the recess between the PCD or PCBN material and the blank.

Typically the method comprises the further steps of applying the blank with the PCD or PCBN element formed therein to a shank to form a machining tool and then machining the tool to form machining faces therein, said faces at least partially formed with the material of the element.

The end face of the blank in which the recess is provided can be of any required form depending on the subsequent tool to be formed. For example, if the tool to be formed is a twist drill the end face will have a conical shape and typically the angle of the bottom surface of the recess and the slope of the bottom face of the element will match that of the top face. Typically the top face of the element which is formed will match the angle of the conical tip of the blank due to the pressing action of the forming apparatus which can be a conventional mould press for this purpose. The angle of the conical tip is dependent upon the specific purpose for the tool but one common angle is 118 degrees. If the tool to be formed is a recess drill or end mill as opposed to a twist drill no conical tip will be formed.

In a preferred form the blank, once formed, is joined to the shank to form the machining tool by brazing and can be machined prior to attachment to the body shank portion such that the flutes and machining faces are formed therein whereupon the blank is attached to the shank and the remaining required flutes then formed in the shank but typically and more practically the blank is first joined to the shank and the machining faces then formed in both as it is easier to do and there are no problems with aligning the machining faces and flutes formed.

Specific embodiments of the invention will now be described with reference to the accompanying drawings wherein.

Figure 1:
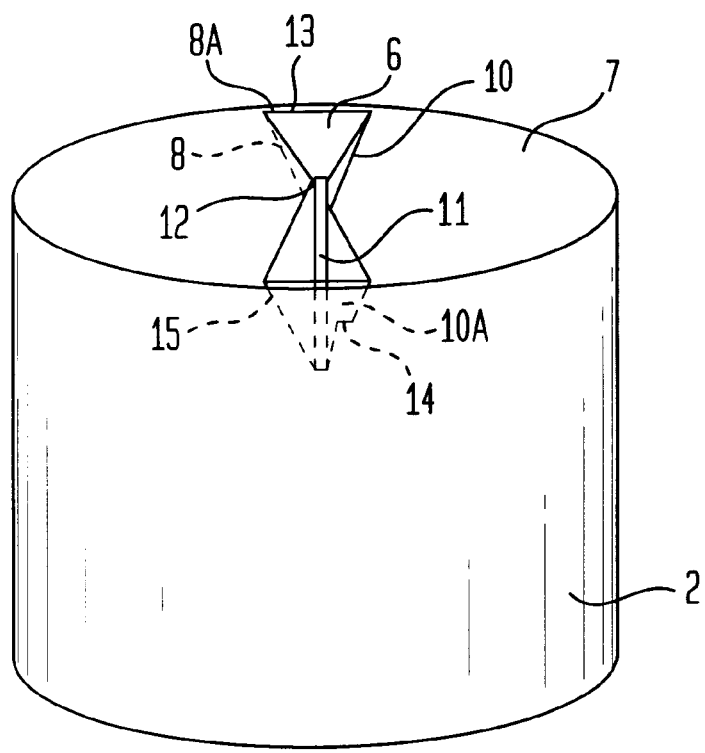
FIG. 1 illustrates a perspective view of a blank for a machining tool according to a first embodiment, showing one embodiment of a recess.
Figure 2:
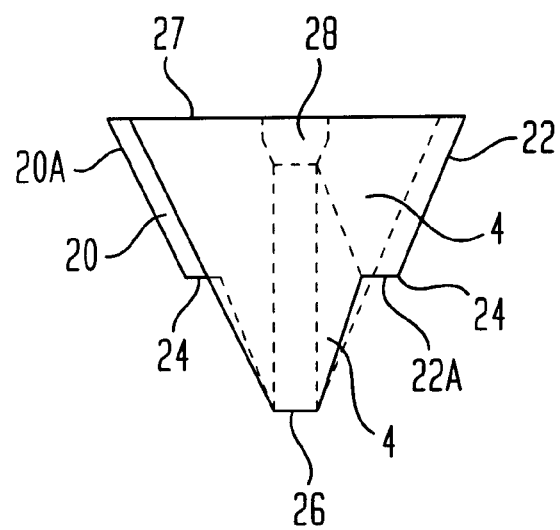
FIG. 2 illustrates an end view of an element which is formed in the blank recess of FIG. 1.

Referring firstly to FIGS. 1 and 2 there is shown a blank 2 for use to form a machining tool according to one embodiment of the invention. The blank 2 which is cylindrical in form includes, formed in the end face 7 thereof, a recess 6 defined by side walls 8,10, a bottom wall 11 and end walls 13,15. The side walls fan outwardly in pairs from a narrow section 12 which is located, in plan, at the centre of the face 7. The side walls, 8,10 follow the required helix angle for the flutes which are subsequently to be formed therein to thereby minimise subsequent machining requirements and are provided with portions, in this case 8A and 10A as shown, which have a step 14 formed therein and typically these portions form the leading or machining faces of the tool formed from the blank when the tool is rotated for use. Additionally, the bottom wall 11 of the recess slopes away from the centre section 12 of the recess 6 such that the shallowest part of the recess is provided at the section 12 and the deepest parts of the recess are provided adjacent the end walls 13, 15. Typically the walls 7, 8A, 9, 10A, 13,15 are angled to allow the manufacture and forming of the PCD or PCBN material into the element therein to be improved.

In addition to providing the PCD or PCBN material to be held in the required shape and angle for subsequently forming the machining faces of the blank, the recess also acts as a mould for forming the PCD or PCBN element and FIG. 2 shows for illustrative purposes only one such element 4 formed of PCD or PCBN although it should be appreciated that this element is not normally viewable as it is formed by placing PCD or PCBN material in a powder form into the recess 6 to fill the same whereupon pressure is applied to the material and blank to pack the same into the recess and also temperature is applied to form the PCD or PCBN powder into a solid element and also fuse the element to the material of the blank so that once in the form of an element as shown in FIG. 2 the element is an integral part of the blank and is not removable from the same. Furthermore as the same is fused and not fabricated to the blank so there are no gaps or other flaws which can lead to damage of the tool during use. The element is thus formed so that the appropriate portions 20A, 22A of the side faces 20, 22 are formed with stepped portions 24 and the bottom face 26 slopes away from the narrow section 28 of the element. As discussed previously the outer face of the element will typically be formed in the same plane as the end face of the blank, and can, for example, depend outwardly and downwardly from the narrow section 28 thereby minimising the need for subsequent machining of the blank.

In use, the portions 20A,22A are exposed by subsequent machining of the blank to form the machining faces of the tool such that, as the tool rotates, the portions 20A, 22A form the machining faces of the tool which contact with the article being machined.

Figure 3:
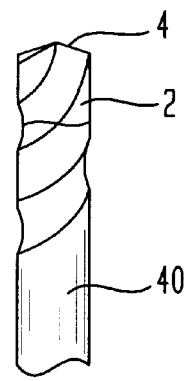
FIG. 3 illustrates the components of FIGS. 1 and 2 fitted to a shank with machining faces formed therein to form a machining tool according to one embodiment of the invention.

FIG. 3 illustrates the blank 2 with the element 4, joined to a shank 40 to form a machining tool according to the invention which in this case is shown as a drill.

Figure 4:
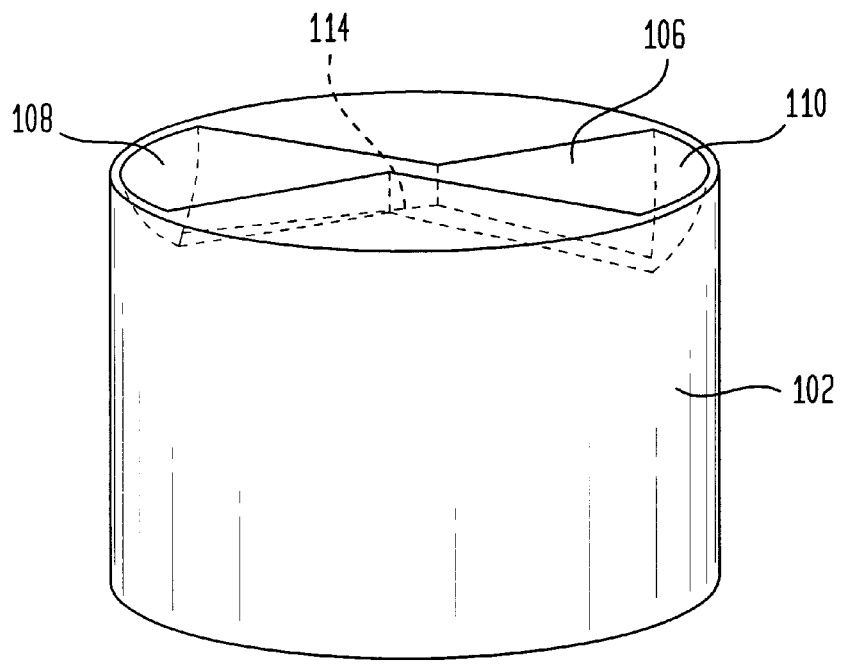
FIG. 4 illustrates a perspective view of the blank of a machining tool with a recess in a second embodiment.
Figure 5:
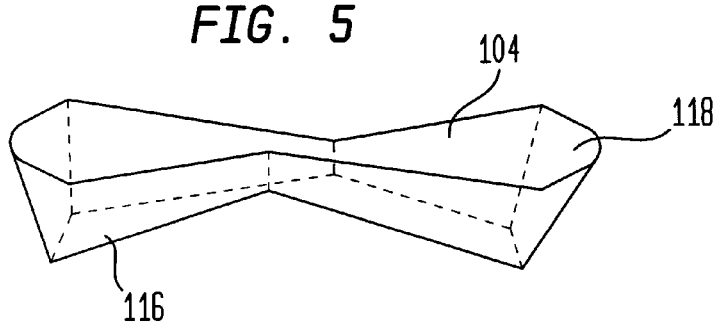
FIG. 5 illustrates an element formed in the recess of the blank of FIG. 4.

Referring now to FIGS. 4 and 5 there is shown a further embodiment of the invention wherein a blank 102 is provided with a recess 106 with two fan shaped portions 108,110 depending outwardly from a centrally located narrow section 114.

FIG. 5 illustrates an element of PCD or PCBN material 104 which will be formed in the recess 106 and fused thereto which is provided with arms 116, 118 the shape of which is determined by the portions 108, 110 of recess 106, wherein the bottom faces of the arms are sloped. Typically, the respective side faces on each arm 116, 118 are angled relative to the longitudinal axis of each portion such that each portion fans outwardly from the centre section 114.

Figure 6:
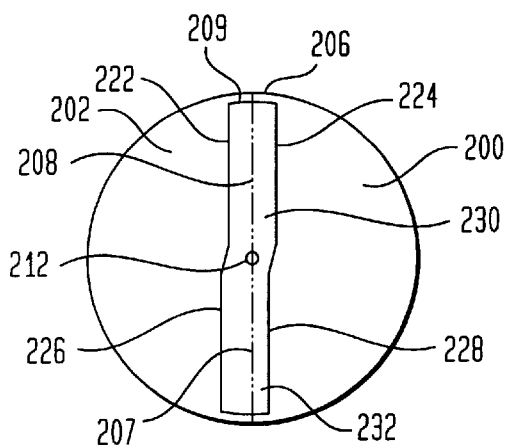
FIG. 6 illustrates a plan view of a further embodiment of a blank according to the invention.
Figure 7:
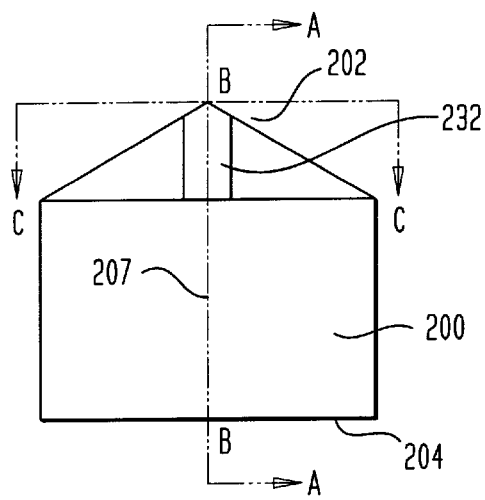
FIG. 7 illustrates an elevation of the blank of FIG. 6.
Figure 8:
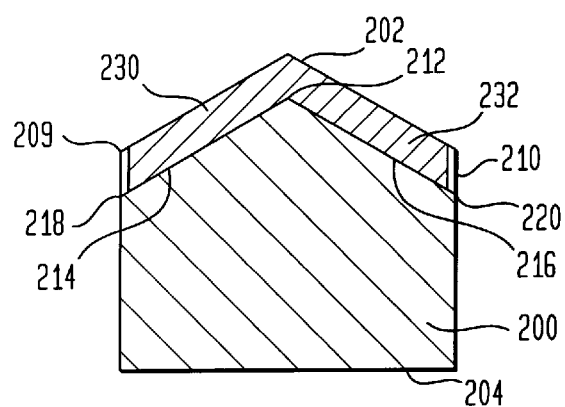
FIG. 8 illustrates a sectional view along A—A of FIG. 7.
Figure 9:
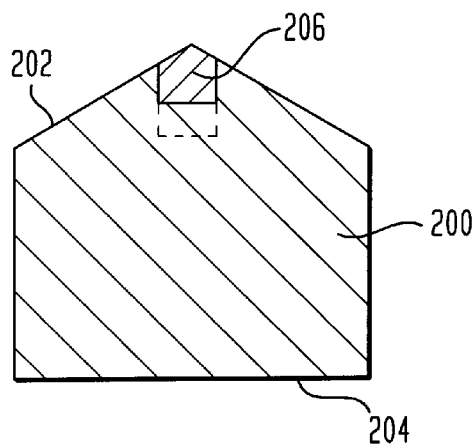
FIG. 9 illustrates a sectional view along B—B of FIG. 7.
Figure 10:
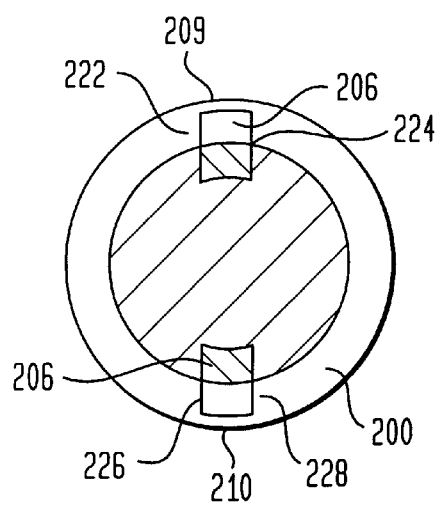
FIG. 10 illustrates a section along line C—C of FIG. 7.
Figure 11:
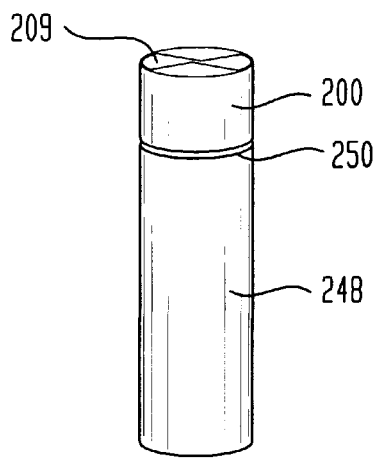
FIG. 11 is view of a machining tool formed using the blank of FIGS. 6–10 joined to a shank prior to having machining faces formed therein.

FIG. 6 illustrates a plan view of a blank 200 to be formed into a drill bit with a conical cutting tip and FIGS. 7–10 illustrate further views of the blank 200 which is an alternative embodiment according to the invention. The body of the blank has a cylindrical form with a conical first face 202 and a flat second end face 204. The face 204 is provided for brazing to a shank while the face 202 is to be machined to form the machining faces of the tool therein. The face 202 is provided with a recess 206 therein which has a longitudinal axis 207 which passes substantially, but not wholly, along the length of the diameter 208 of the face such that the length of the recess is defined by end walls 209, 210. The recess 206 thus defined receives PCD or PCBN material in a powder form therein and with the application of heat and pressure to element 209 of PCD or PCBN material is formed which has the form of the recess, which has acted as the mould, and said element is fused to the blank.

The recess, in this form, has a relatively shallow centre section 212 from which the bottom surfaces 214, 216 of the recess slope downwardly to the deepest sections 218, 220 respectively, adjacent the end walls 209, 210. Typically, if a twist drill bit is subsequently to be formed from the blank, the base will slope at an appropriate angle such as at an angle of 118 degrees included point angle, from the centre.

In plan, the pairs of side walls 222, 224 and 226, 228 of the recess depend outwardly from the centre section 212 of the recess to form shaped portions 230, 232. Advantageously a substantial part of each of these portions is offset from the longitudinal axis 207 of the recess such that a greater portion of each portion lies to one side of the longitudinal axis. When viewed in plan the portions are arranged such that the greater parts of each portion are provided on opposing sides of the axis 207. This arrangement provides greater strength and resistance characteristics for the tool machining faces subsequently formed in the blank.

To form the blank, and in turn the machining tool, according to the invention, the blank 2, 102, 200 is required to be machined and the first stage is to machine the material from which the blank is made into the required form including the formation of the recess portion 6, 106, 206 therein. Typically, the recess is provided in a location such that the element of PCD or PCBN material subsequently formed therein will be located to form at least part of the subsequently formed machining faces of the tool in order to obtain the benefit of the PCD or PCBN material used. The element of PCD or PCBN material is formed by placing PCD or PCBN material in a powder form into the recess 6, 106, 206 and then applying pressure and heat to form the powder into an element of the form of the recess and also cause material of the blank, such as cobalt to leach into or, alternatively cobalt, nickel or iron admixtures mixed with or placed next to, or any combination of the same to, the PCD or PCBN material and cause the element to fuse with the blank and act as an integral part thereof. Thus the recess, with its end walls, side walls and base wall acts as a mould to which form the PCD or PCBN element is made and under the high temperature and high pressure applied joins with the element and this process utilising the cobalt or other suitable materials acts to bind the element to the blank which is typically carbide to effectively form the element as an integral part thereof and hence no gaps are left between the element and the blank. As discussed previously this represents a considerable advantage over conventional fabrication techniques. Furthermore, as the element is formed to the shape of the recess, it, and the carbide blank, can be provided in a form which ensures that the benefit of the PCD or PCBN material can be maximised in terms of the positioning of the element relative to the machining faces of the tool subsequently formed therein and the thickness of the material provided and the specific shaping of the element relative to the machining faces, such as the flutes, of the tool can be determined and designed accurately.

In some instances it is possible that the blank may be provided with an integral shank also formed of carbide but, typically the blank as described above is required to be connected to a shank portion 40;248 which may be formed of another material such as a suitable cemented carbide, a ceramic, an elemental metal or alloy depending upon the specific requirements for the tool. In order for the blank to be joined to the shank portion to form the machining tool one option is to perform a brazing operation and a preferred form of brazing operation utilises a filler metal 250 which has a liquidus greater than the degradation temperature of the PCD or PCBN element which can be, for example, 700 degrees Celsius. A heat sink can also be provided to prevent the brazing operation from heating the blank portion. The shank can be made of any suitable material such as carbide, steel or steel alloy.

The method for brazing so described has specific advantages when used for forming machining tools and said advantages overcome the problems of conventional tools wherein, for example in U.S. Pat. No. 4,713,286, it is admitted that the brazing of the blank to the shank can be the weakest part of the tool and represents a flaw in the same. In contrast the brazing technique as described herein allows a strong join to be provided between the blank and the shank and overcomes the risk of failure. Furthermore as the brazing technique described has a significantly more localised effect on the blank than conventional techniques it is possible for the height of the blank to be considerably reduced as there is a much reduced risk of the brazing process having a damaging effect on the material of the element and the integrity of the blank.

Figure 12:
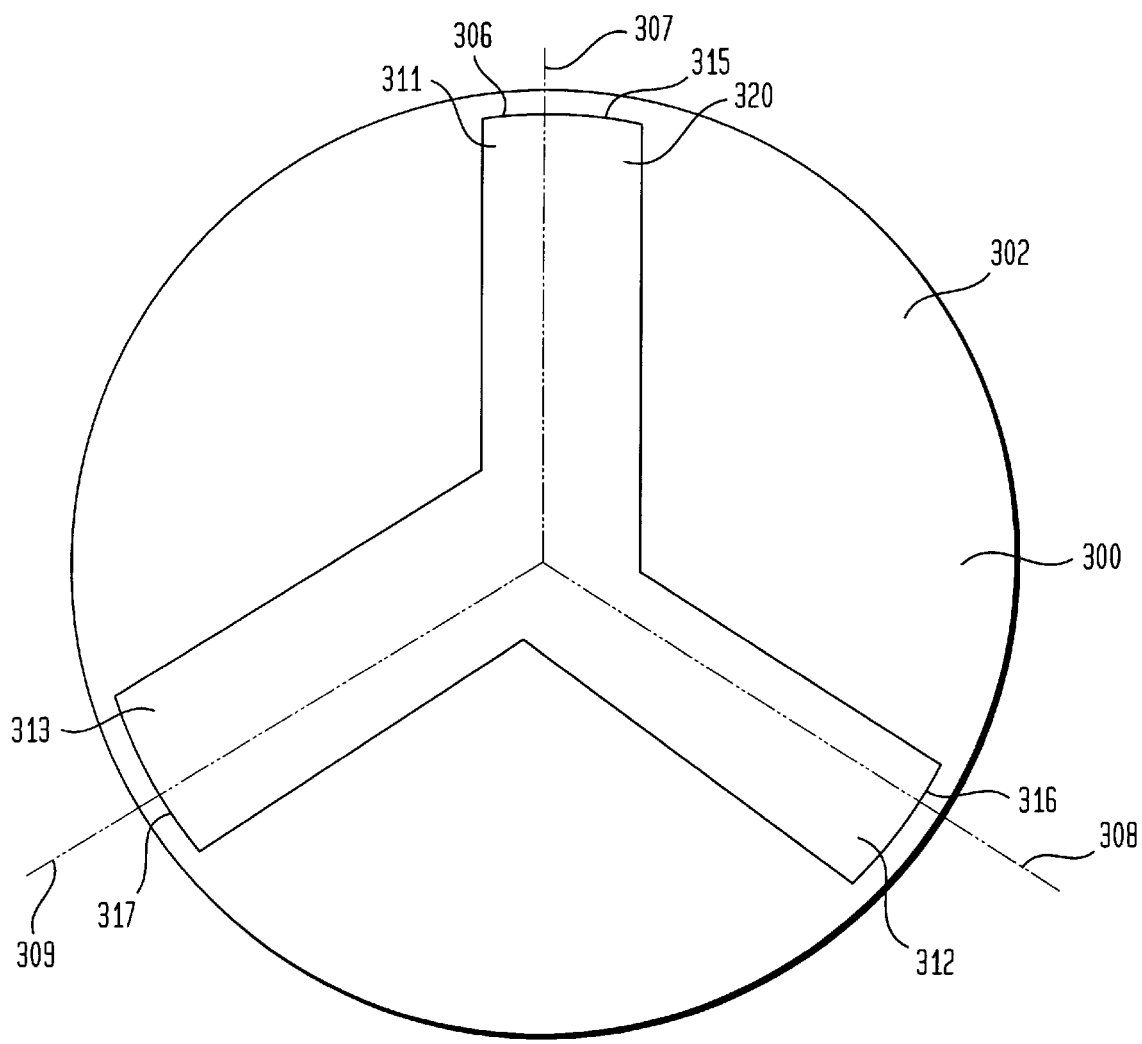
FIG. 12 is a simplified schematic plan representation of an embodiment of the invention having a three-portion recess.

Thus, the invention of the application provides a machining tool which has machining faces formed of PCD or PCBN material thereby providing faces with the required strength and hardness which the PCD or PCBN material provides. The invention further provides an economic, feasible and practical manner in which the PCD or PCBN material can be provided in the required location and form for specific machining tool configurations and of the required thickness at the required locations. The provision of the PCD or PCBN element which is formed as an integral element of the blank ensures that the problems associated with conventional fabrication methods are avoided and the use of the brazing method disclosed for joining the blank to the shank ensures that the machining tool formed has sufficient strength to withstand the stresses of operation FIG. 12 is a simplified schematic plan representation of an embodiment of the invention having a three-portion recess. As shown therein, a blank 300, is provided which may be formed into a drill bit (not shown in this figure) with a conical cutting tip, as described hereinabove with respect to FIGS. 6 and 7. Blank 300 is provided with a conical first face 302 having a recess 306 having a longitudinal axis 307. In this specific illustrative embodiment of the invention, the longitudinal axis has a radial configuration, and there are provided two additional such longitudinal axes, 308 and 309, respectively. In this embodiment, the longitudinal axes are separated from one another by 120°.

Recess 306 has three portions, 311, 312, and 313, bounded by end walls, 315, 316, and 317, respectively. An element 320 formed of PCD or PCBN material is formed in recess 306, as described hereinabove. The recess acts a mould, and the element is fused to the blank, as previously described. The various portions 311, 312, and 313 may be configured cross-sectionally in the manner described hereinabove with respect to FIG. 1.

Although the invention has been described in terms of specific embodiments and applications, persons skilled in the art can, in light of this teaching, generate additional embodiments without exceeding the scope or departing from the spirit of the claimed invention. Accordingly, it is to be understood that the drawing and description in this disclosure are proffered to facilitate comprehension of the invention, and should not be construed to limit the scope thereof.

What is claimed is:

1. A blank for use in forming a machining tool with machining faces formed therein, the blank including an element formed of PCD or PCBN material positioned within a recess in the blank and arranged to depend outwardly and downwardly from a center point of an end face of the blank, characterized in that the recess is defined by an end wall, a side wall, and a base, wherein the shape of the element of PCD or PCBN material is defined by the end wall, the side wall, and the base, the end wall, the side wall, and the base further being used for forming the element in the blank.

2. A blank for use in forming a machining tool according to claim 1, wherein the element is formed of powdered PCD or PCBN material which is placed to fill the recess in the blank, the powdered PCD or PCBN material then being pressed and heated to a temperature sufficient to cause the powdered PCD or PCBN material to form the element and to fuse with the blank.

3. A blank for use in forming a machining tool according to claim 1, wherein there is further provided a shank, the blank being affixed to the shank and formed to have machining faces to form a machining tool, the machining faces incorporating at least a portion of the material of the element.

4. A blank according to claim 1, wherein the recess has a longitudinal axis that is located substantially along a diameter of the end face of the blank.

5. A blank according to claim 1, wherein there are further provided further side walls to form first and second pairs of sidewalls, the first and second pairs of side walls of the recess being arranged to fan outwardly from the center point of the end face.

6. A blank according to claim 1, wherein there are further provided further side walls to form first and second pairs of sidewalls, the first and second pairs of side walls of the recess being arranged such that the angle of one wall in each pair relative to a vertical plane is greater than the angle of the other wall in said pair.

7. A blank according to any of claims 1–6, wherein first and second pairs of side walls are provided in the recess, a first pair depending outwardly form a narrow portion of the same in a radial manner in a first direction and a second pair depending radially outwardly form the narrow portion in a second direction.

8. A blank according to claim 7, wherein there is provided a third pair of side walls to form a three-portion recess, the portions being spaced apart by approximately 120°.

9. A blank according to claim 1, wherein the base of the recess slopes downwardly away from the center of the face of the blank in which the recess is formed, the center of the face of the blank the shallowest region of the recess, and the end walls of the recess being the deepest regions of the recess.

10. A blank according to claim 1, wherein a series of recesses is formed at predetermined positions on the blank relative to the machining faces to be formed therein.

11. A blank according to claim 1, wherein a portion of at least one of the side walls of the recess is provided with step portion formed therein.

12. A blank according to claim 1, wherein the recess has an axis that is located substantially along a radius of the end face of the blank, a fan shaped portion depending outwardly from the center of the face and being asymmetrically distributed across its respective longitudinal axis so as to be offset to one side of the longitudinal axis.

13. A blank according to claim 1, wherein a plurality of PCD or PCBN elements are formed therein.

14. A method for forming a machining tool blank for a machining tool, the method comprising the steps of:

forming a blank having a cylindrical shape and in at least one of said first or second end faces forming a recess;

filling the recess at least partially with PCD or PCBN material in a powder form;

providing a material from the transition group of elements;

applying pressure to the PCBN or PCD material; and heating the blank and PCD or PCBN material to form the same into an element fused with the blank, wherein the shape of the element is defined by the shape of the recess, the recess having a shape that is defined by an end wall, side walls, and a base.

15. A method according to claim 14, wherein the blank is formed of a carbide material, the material from the transition group of elements being cobalt which leaches into the PCD or PCBN material from the carbide blank when heated.

16. A method according to claim 14, wherein the step of providing a material from the transition group of elements comprises a selectable combination of:

mixing the material from the transition group of elements in a powder or granular form with the PCD or PCBN material; and inserting the material from the transition group of elements as an insert in the vicinity of the PCD or PCBN material; and there being further provided the steps of;

joining the blank with the PCD or PCBN element formed therein to a shank to form the tool; and machining the tool to form machining faces therein, the resulting machining faces being at least partially formed of exposed material of the element.

17. A method of forming a machining tool comprising the steps of:

forming a blank having a cylindrical shape and in at least one of said first or second end faces forming a recess;

filling the recess at least partially with PCD or PCBN material in a powder form;

providing a material from the transition group of elements;

applying pressure to the PCBN or PCD material;

heating the blank and PCD or PCBN material to form the same into an element fused with the blank, wherein the shape of the element is defined by the shape of the recess, the recess having a shape that is defined by an end wall, side walls, and a base;

joining the blank with the PCD or PCBN element formed therein to a shank to form the machining tool; and machining the machining tool to form machining faces therein, the resulting machining faces being at least partially formed of exposed material of the element.

18. A method according to any of claims 14–17, wherein when the top face of the element is formed it is formed to correspond to a predetermined angle of the tip of the tool to be formed therefrom.

19. A method according to claim 17, wherein, the step of joining the blank with the PCD or PCBN element formed therein to a shank to form the machining tool comprises the step of brazing the blank to the PCD or PCBN element.

20. A method according to claim 19, wherein there is provided the further step of applying a heat sink during the step of brazing for preventing heat damage to the blank and the PCD or PCBN element.

* * * * *